(12) United States Patent
Maruyama et al.

(10) Patent No.: US 11,526,623 B2
(45) Date of Patent: Dec. 13, 2022

(54) INFORMATION DISPLAY CONSIDERING PRIVACY ON PUBLIC DISPLAY

(71) Applicant: INTERNATIONAL BUSINESS MACHINES CORPORATION, Armonk, NY (US)

(72) Inventors: Daisuke Maruyama, Yamato (JP); Tomoko Kuwata, Tokyo (JP); Yuta Adachi, Koto-Ku (JP); Yuya Suzuki, Saitama (JP); Mikio Kurihara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 16/438,653

(22) Filed: Jun. 12, 2019

(65) Prior Publication Data

US 2020/0394326 A1    Dec. 17, 2020

(51) Int. Cl.
*G06F 21/62* (2013.01)
*G06F 3/14* (2006.01)
*G09G 5/12* (2006.01)
*G06F 3/01* (2006.01)
(Continued)

(52) U.S. Cl.
CPC .......... *G06F 21/6245* (2013.01); *G06F 3/016* (2013.01); *G06F 3/14* (2013.01); *G06F 21/35* (2013.01); *G06F 21/60* (2013.01); *G06F 21/6254* (2013.01); *G09G 5/12* (2013.01); *G06F 2221/2111* (2013.01); *G09G 2358/00* (2013.01)

(58) Field of Classification Search
CPC ........ G06F 21/6245; G06F 3/016; G06F 3/14; G06F 21/35; G06F 21/60; G06F 21/6254; G09G 5/12
See application file for complete search history.

(56) References Cited

U.S. PATENT DOCUMENTS 11,157,650 B1 * 10/2021 Kennedy ............. G06F 16/2462
2006/0123461 A1 * 6/2006 Lunt .................. G06F 21/6254
726/1

(Continued)

OTHER PUBLICATIONS

Teska (Pseudonymization, Anonymization, Encryption . . . what is the difference? Published on Nov. 28, 2017, 14 pages) (Year :2017).*

(Continued)

*Primary Examiner* — Oleg Korsak
(74) *Attorney, Agent, or Firm* — Robert D. Bean (57) ABSTRACT

According to one embodiment, a method, computer system, and computer program product for displaying information on a public device is provided. The present invention may include displaying, based on information received from a connected mobile device, user information and dummy information on a display device. The present invention may further include displaying an indicator alongside the user information and a dummy indicator alongside the dummy information. The present invention may further include transmitting user information and dummy information to a display device, synchronizing display of the user information to the display device, and synchronizing haptic feedback based on a received visual pattern. The present invention may further include generating dummy information according to the type of information.

17 Claims, 7 Drawing Sheets

(51) Int. Cl.
  *G06F 21/35* (2013.01)
  *G06F 21/60* (2013.01)

(56) References Cited

U.S. PATENT DOCUMENTS

| | | | |
|---|---|---|---|
| 2010/0114840 A1* | 5/2010 | Srivastava | G06F 21/6254 707/688 |
| 2014/0176394 A1* | 6/2014 | Horiuchi | G06F 3/1415 345/1.3 |
| 2016/0182613 A1 | 6/2016 | Brune et al. | |
| 2016/0315986 A1 | 10/2016 | Chen | |
| 2017/0289596 A1 | 10/2017 | Krasadakis et al. | |
| 2018/0113670 A1 | 4/2018 | Liu et al. | |
| 2018/0285592 A1* | 10/2018 | Sharifi | G06F 21/84 |
| 2019/0066686 A1* | 2/2019 | Baracaldo Angel | G06F 21/6245 |
| 2020/0151240 A1* | 5/2020 | Baracaldo-Angel | G06N 20/00 |

OTHER PUBLICATIONS

Reiter, Releasing multiply imputed, synthetic public use microdata: an illustration and empirical study, J. R. Statist. Soc. A (2005) 168, Part 1, pp. 185-205 (Year: 2005).*
Erlingsson et al., RAPPOR: Randomized Aggregatable Privacy-Preserving Ordinal Response, arXiv:1407.6981v2 [cs.CR] Aug. 25, 2014, 14 pages (Year: 2014).*
Barrientos et al., Providing Access to Condential Research Data Through Synthesis and Verication: An Application to Data on Employees of the U.S. Federal Government, arXiv:1705.07872v2 [stat.AP] Jun. 16, 2018, 28 pages (Year: 2018).*
Mell et al., "The NIST Definition of Cloud Computing", Recommendations of the National Institute of Standards and Technology, NIST Special Publication 800-145, Sep. 2011, 7 pages.
Hoshi et al., English Language Abstract for "A Study on Travel Direction Estimation for PDR Using a Smartphone", Proceedings of the 77th Annual Conference, Year of Issue: Mar. 17, 2015, pp. 3-297-3-298.
IBM, "IBM InfoSphere Optim Data Masking Solution", IBM Software Solution Brief, Nov. 2017, pp. 1-6.
IBM, "Watson Chatbot 4", THINK Watson, printed on Jul. 27, 2018, 20 pages, https://www.ibm.com/think/jp-ja/watson/chatbot-conversation-1/, English translation provided.
JINGO Japan, "Is OTP Topped?", Apr. 24, 2015, 6 pages, English translation provided.
Japanese Engadget com, "Demonstration Experiment of Navigation Service at Tokyo Station", printed Feb. 15, 2019, 5 pages, https://japanese.engadget.com/2014/12/02/jr-ios-I 60/, English translation provided.
Rinazo.com, "Laugh Dummy Text", Mar. 26, 2012, 7 pages, http://laugh.rinazo.com/2012/03/26/1268, English translation provided.
P-Pointer, "Personal Information Detection Tool", printed Jul. 27, 2018, 29 pages, https://ppointer.jp/, English translation provided.
Skysea, "Skysea Client View", Information Magazine, 2019 © Sky Corporation, 22 pages, http://www.skyseaclientview.net/skyseanews/vol45_3/, English translation provided.
Au, "Sync Yell", printed Jul. 23, 2018, 5 pages, http:/connect.kddi.com/sync/yell/.
Shimoyama et al., "Realization of Ubiquitous Living Device", Real-World Information System Projec—Human Robot Research Group—Using Micro/Nano Fusion Technology, accessed Feb. 11, 2019, 13 pages, English translation provided.
Wataru et al., English language abstract for "View Private Information Input / Output Usage Statistics on an Interactive Large Public Display", Proceedings of the 74th Annual Conference, Mar. 6, 2012, pp. 343-344.
Hiroshi, et al., "A study on travel direction estimation for PDR using smartphones," Information Processing Society of Japan 77th National Convention, 2015, 4 pages, Translated with Google Translate, Retrieved from the Internet: <URL: file:///C:/Users/ErikaFlores/Downloads/IPSJ-Z77-1W-03%20(1).pdf>.
IBM, "IBM Products," IBM.com [online], [accessed on Jan. 27, 2022], 15 pages, Retrieved from the Internet: <URL: https://www.ibm.com/products?types[0]=software>.
IBM, "Smarter Business," IBM.com [online], Oct. 22, 2021 [accessed on Jan. 27, 2022], 15 pages, Retrieved from the Internet: <URL: https://www.ibm.com/blogs/smarter-business/business/>.
Laugh, "This is convenient! I picked up a site that generates dummy text in Japanese and English," rinazo.com [online], Mar. 26, 2012 [accessed on Jan. 27, 2022], 18 pages, Internet Archive Wayback Machine, retrieved from the Internet: <URL: https://web.archive.org/web/20130423063225/http://laugh.rinazo.com/2012/03/26/1268>.
Matsukawa, "JR East releases iOS app "Tokyo Station Navi". Pinpoint guidance with 160 beacons," Engadget.com [online], Dec. 2, 2014 [accessed on Jan. 27, 2022], Translated with Google Translate, Retrieved from the Internet: <URL: https://japanese.engadget.com/jp-2014-12-02-jr-ios-160.html>.
Naito, et al., "Input / output of private information on a large interactive public display," Information Processing Society of Japan 74th National Convention, 2012 [accessed on Jan. 27, 2022], 4 pages, Translated with Google Translate, Retrieved from the Internet: <URL: https://ipsj.ixsq.nii.ac.jp/ej/index.php?action=pages_view_main&active_action=repository_action_common_download&item_id=110520&item_no=1&attribute_id=1&file_no=1&page_id=13&block_id=8>.
Undisclosed Authors, New technology, new impression! A heart-warming promotion case using Beacon, BeaconLabo [online], [accessed on Jan. 27, 2022], 7 pages, Internet Archive Wayback Machine, Retrieved from the Internet: <URL: https://web.archive.org/web/20150418011612/http://beaconlabo.com/2015/04/822/>.

* cited by examiner

INFORMATION DISPLAY CONSIDERING PRIVACY ON PUBLIC DISPLAY

BACKGROUND

The present invention relates, generally, to the field of computing, and more particularly to the Internet of Things.

The Internet of Things (IoT) is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device. As IoT technologies have evolved, they have revolutionized such fields as home automation, manufacturing, agriculture, transportation, medicine, healthcare, energy management and more. Wherever there are two or more connected devices, IoT technology may be harnessed to solve problems.

SUMMARY

According to one embodiment, a method, computer system, and computer program product for displaying information on a public device is provided. The present invention may include displaying, based on information received from a connected mobile device, user information and dummy information on a display device, such that onlookers cannot distinguish user information from dummy information and the privacy of the user information is protected, allowing user information to be automatically displayed on standard public display devices, reducing the need for users to check their mobile devices and reducing distractions, collisions, and saving time. The present invention may optionally include displaying an indicator alongside the user information and a dummy indicator alongside the dummy information so that a user can quickly recognize the indicator and identify user information pertaining to the user. The present invention may further include transmitting user information and dummy information to a display device, synchronizing display of the user information to the display device, and synchronizing haptic feedback based on a received visual pattern, so that the user may quickly identify when user information is displayed by haptic feedback from a mobile device. The present invention may further include generating dummy information according to the type of information, which allows for more efficient generation of dummy information that is more similar to user information.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the Internet of Things. The following described exemplary embodiments provide a system, method, and program product to, among other things, utilize dummy information to allow the public display of a user's information while maintaining the privacy of that information.

As previously described, the Internet of Things (IoT) is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device. As IoT technologies have evolved, they have revolutionized such fields as home automation, manufacturing, agriculture, transportation, medicine, healthcare, energy management and more. Wherever there are two or more connected devices, IoT technology may be harnessed to solve problems.

Installation of displays of various sizes in public spaces has become common as display devices have become cheaper and larger; these public displays serve to advertise, guide passengers around, for example, transportation stations, provide information, serve as signage for businesses, and more. Meanwhile, with the widespread use of smartphones and tablets, individuals have become accustomed to carrying devices that can conveniently and automatically interface with public displays. Furthermore, as map applications and games using location information, among others, have become prevalent, using smartphones while walking has materialized as a social problem. Therefore, there is a benefit in linking users' mobile devices with public displays to automatically display helpful information tailored to a user as a user approaches the public display, such as by allowing users to navigate or assimilate information from a public display without having to sacrifice alertness to consult a mobile device. Such a solution stands to reduce injury from collision, speed user's progress to a destination, increase the efficiency of information kiosks, reduce the number of stationary individuals within busy public areas, and other such benefits. Allowing navigation or other information rendered on the smartphone of a particular user to be displayed on a public display may also enable other persons traveling with the particular user to easily view the information.

One obstacle to implementing any means of displaying information tailored to a user is privacy; if displayed information is tailored based on a user's private information, or is private information itself, that privacy must be maintained so that ill-intentioned viewers of the display cannot intercept and utilize the displayed private information in a manner harmful to the user. The prior art has considered the issue of preserving privacy of displayed information on a public display, but the proposed solutions largely concern approaches to shield the displayed private information from the view of everyone except the user to whom the private information belongs. For example, one approach displays private information within the region of a display device that is occluded from view of others by the body of the user. However, this is an imperfect solution as complete blind areas cannot be created. Another proposed solution regards modifying a display device with a lens that displays private information only in the direction of an ID tag corresponding with the user to whom the private information belongs. This as well is imperfect, as this approach cannot be used on an unmodified device, requires users to carry ID tags that identify the user's direction in relation to the device, and cannot guarantee that other individuals in the same general direction do not also see the private information. As such, there exists a need for a method of preserving privacy that does not require specialized display equipment, and works even where additional individuals are in a similar direction or location as the user relative to the device.

According to one embodiment, the invention is a system in which "user information" from a user's mobile device is displayed on a public display, and where the system receives the information from the mobile device and transmits or otherwise provides the information to the public display along with a plurality of "dummy information;" the dummy information may be meaningless placeholder information that is displayed to be very similar in format and layout as information pertaining to a user, or user information, such that it might be very difficult for an onlooker to distinguish between dummy information and user information. For example, dummy information is presented as so it may appear to be correct or genuine information for a particular user, but which is incorrect because the particular user does not exist. A public display may display both genuine information and dummy information. The genuine information may be from a particular user's smartphone. Dummy information may be rendered on a public display along with the genuine information so that the general public may be unable to distinguish between genuine and dummy information The display system displays the genuine and dummy items of information together in order to obfuscate, from the perspective of an onlooker, any perceptible connection between displayed information and the individual to which the information pertains. In this way, the public display system displays the information received from the mobile device, and a danger associated with using smartphones while walking can be avoided.

The user information, or the information that pertains to a user and is for display on the public display, may be of many types and formats depending on context and the needs of the user; for instance, where a user is attempting to navigate to a location within a building or on a street, the user information displayed on the public display may include an arrow indicating direction, the distance to the destination from the user or from the public display, directions such as 'turn left,' continue straight,' et cetera. User information may further include, for example, the weather in a user's location, text messages received by the user, upcoming events in the user's schedule, vitality tracker information such as number of steps or heart rate, news alerts, notifications from games or applications, or generally any information that a user might desire to see on a public display without having to look at their mobile device. A user may designate beforehand the types of information that are to be considered user information for the purposes of public display. Dummy information may conform to the same information types as the user information. In some embodiments of the invention, types of user information may not be publicly displayed if corresponding types of dummy information are not available.

In another embodiment, types of user information may be classified based on the application from which the user information originated; for example, user information that originated from a navigation application may receive a classification as navigation type, information originating from a messaging application may receive a classification as a message type, and user information originating from a weather or news application may be classified as an event type. The system may communicate the type by appending a tag to the information when it is sent or received. In such embodiments, dummy information may be likewise classified. The inclusion of tags may enable or improve type-wise dummy information generation.

In another embodiment, the system may transmit the information of the user to the public display system along with an indicator that serves to render displayed private information pertaining to a user immediately recognizable to that user. This indicator may be any visual element that the owner of the information will recognize. For example, an indicator may be a photograph of the user's own dog or belongings. The indicator may also be a code word, phrase, or number that is unique to one user. The indicator may also be a word or phrase that is significant to the user but not significant enough to represent private information, such as old street addresses, pet names, make and model of first car, et cetera. Multiple indicators may be employed, either at once or alternating in a sequential or random fashion. In some embodiments, the type of indicator displayed alongside the user information and the dummy information may change randomly, after a predetermined period, or in response to a particular condition or event; for example, at the end of each day the type of indicator may change from a picture of a family pet to an old street address, and at the end of the next day, may change from an old street address to a code word; changing the indicator may improve the security of private information by preventing onlookers from identifying indicators associated with a particular user. A dummy indicator may be rendered on a public display along with an instance of dummy information. The type of indicator may change for all users and dummy information, or may change for each user. In some embodiments, each user or article of user information and article of dummy information might have a number of different indicators that the system cycles through in any order.

In some embodiments, the indicator may be a combination of visual effects applied to the user information, for instance some combination of shadows, fonts, colors, outlines, underlining, et cetera. The indicator may further comprise the position of the user information on the public display, which may be consistent for a user. As an example, user information corresponding with user X may be displayed in pink, and is always displayed at an upper right position of the public display, while the dummy information is displayed in other random colors and locations. In some embodiments, the system may display correct user information on the user's mobile device, so that in situations where the user is having difficulty identifying user information on the public display, for instance where the color of the user information is similar to the color of a dummy information element, the user may consult the user's mobile device to determine a position at which the user information is displayed.

Figure 7:
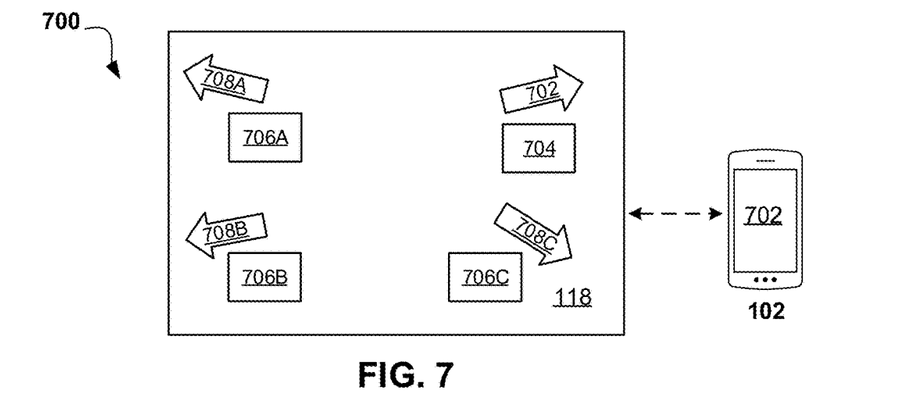
FIG. 7 depicts an exemplary use case of a privacy-sensitive public information display process according to at least one embodiment.

In some embodiments, the system may display user information and any indicators as "articles," which may be a discrete grouping of user information and corresponding indicators that are visually linked for quick and easy parsing by a user. For example, indicator 704, and user information 702 in FIG. 7 are an article. In such embodiments, the dummy information and corresponding dummy indicators may also be displayed as articles, e.g., dummy indicator 12 and dummy information 14; while the advantages of the article in terms of quick and easy parsing do not apply to the dummy information, the dummy information must nevertheless appear visually identical or similar to the user information to protect privacy of user information. An article may be visually linked by proximity; for example, in the case where user information is navigation information, and the indicator is a picture of a pet dog, the article of user information may be an arrow indicating the correct direction of travel, with the distance to the destination displayed a short distance above the arrow and the picture of a pet dog displayed at a short distance below and to the right of the arrow. The proximity may be a predetermined value and/or may scale based on the size of the display or the number of articles displayed on the display. In embodiments where the indicator is a combination of visual effects such as shadows, fonts, colors, outlines, underlining, et cetera, the article may be visually linked by the indicator. For instance, all the user information in the article may be of the same color and font.

In some embodiments, the system may score or assess information such as the indicators, user information, and dummy information, such as by applying image processing techniques to images, and natural language processing techniques to text, and comparing the indicators against past indicators, sample indicators, or other knowledge bases to flag or eliminate indicators that are inappropriate, stand out too much, contain private information, or other qualities that could compromise the security of the users or the interests of other viewers. In some embodiments, the system may send flagged information to human moderators for assessment.

In some embodiments, e.g., where the mobile device is in connection with a headset, the system may audibly convey the indicator to the user. For instance, where the indicator is a picture, the system may read the subject or title of the picture, and where the indicator is a number, phrase, or word, the system may read that indicator to the user. As an example, the message "(7) Turn left" is displayed as the information of User_003, and the system notifies the user that "your information number is (7)" through the headset. This may reduce the time between when a user sees the display and locates his or her user information on it.

In another embodiment, one or more computer processors may display the user information according to a visual pattern in order to identify the information to the corresponding user. For instance, computer processors may display the user's information in a unique blinking pattern on the public display, and may communicate that unique blinking pattern to the user's mobile device, enabling the mobile device to provide haptic feedback in synchrony with the visual pattern and thereby informing the user of when their private information is being publicly displayed. This may allow a user to locate their information on the public display quickly without viewing a mobile device display, and may be more secure than an indicator, as the haptic feedback helps identify the user information to the user in a fashion which is less perceptible to others than a visual indicator.

In another embodiment, the visual pattern comprises movement, e.g., an up-down motion, of the publicly displayed user information, indicator, or article, where, e.g., the mobile device vibrates while the user information is moving upwards, and stops vibrating when the user information moves downwards, or vice versa. In another embodiment, the visual pattern comprises a combination of motion and stillness, where the location of the user information alternatingly moves and remains stationary; the user's device may vibrate while the user information is moving, and stop vibrating while the user information remains stationary, or vice versa. While the system may employ both indicators and visual patterns of movement at the same time, either may be sufficient alone to render the user content recognizable to users.

In some embodiments, e.g., where the mobile device is equipped with a pedometer, the visual pattern may be a time period of illumination and, for example, based on the gait of the user; the display system may publicly display user information while the mobile device detects the user's step, and then turns off the public display of the user information upon detecting a next step, so as to alternatingly turn the display of the user information on and off as the user walks, creating a visual pattern of blinking that is recognizable to the user and useful even where the user's mobile device is incapable of providing haptic feedback.

In another embodiment, the system may track the location of a mobile device, and may track or infer the direction in which the mobile device is travelling. The system may track the location using methods such as microlocation beacons or other sensors deployed near the display, GPS, et cetera, or may merely receive the location from the mobile device; the system may then display the user information on one or more public displays located in the direction that the mobile device is traveling. In some embodiments, e.g., where location of the mobile device is tracked, the system may publicly display user information whenever the mobile device moves within a threshold distance of a given display, and may cease publicly displaying user information when the mobile device moves outside the threshold distance, or when the direction of travel of the mobile device is away from the public display. The threshold distance may be predetermined, and/or may be related to the size and visibility of the display, and therefore the distance at which a user could reliably discern user information on the display. The threshold distance may be determined based on the size of images and text rendered on the display, e.g., font size. Some example threshold distances may be 10, 25, 50 or 100 feet.

In some embodiments, e.g., where the mobile device is equipped with an accelerometer, such as a smart watch or vitality tracker, the display system may publicly display the user information in response to a gesture or movement, which may be a subtle and intuitive method of initiating display of user information on the public display device. For example, the public display system displays user information while the user is making a gesture of looking at the user's watch (a display screen on a device worn on one's wrist faces vertically upward with respect to the gravitational acceleration direction; the user need not have to actually look at the user's watch), and the public display system does not display the user information while the user is walking (the wrist-worn device display screen is horizontal to the gravitational acceleration direction, or the variation of the acceleration is large). In further examples, the public display system only displays the user information while the user is tapping or touching the smart watch, or only publicly displays the user information while the mobile device is in contact with the user's skin or a sleeve of a user's shirt as in the case of tapping the smart watch. In an additional example, the system may publicly display the user information in response to the accelerator in the mobile device detecting a waving motion, such as when the user waves his or her arm while wearing a smart watch or vitality tracker, or waves a phone. The system may likewise stop publicly displaying user information in response to a particular motion, for instance a shake.

In some embodiments, e.g., where the mobile device is equipped with a microphone, the system may publicly display the user information in response to the voice of the user. For example, the system may publicly display the user information for a certain length of time when the user speaks "display the correct information" into the microphone connected to the mobile device. This may represent a convenient and intuitive method of interfacing with the public display.

In some embodiments, e.g., where the system is equipped or in communication with a camera capable of observing the eye movements of a user, and is equipped with image processing software, the system may publicly display user information in synchronization with the user's blinking. For example, the information may be publicly displayed for a predetermined or random period of time after the user's blinking is detected and the user continuously blinks N times, where N may be any predetermined number. Alternately, when the system detects that the user's eyes are slowly opened or closed, the system may publicly display the user information only while the user's eyes are open.

In some embodiments, e.g., where the user is wearing 3D shutter glasses, the system may publicly display the user information and the dummy information according to blinking patterns with different timings, such that the user information is only visible to the user by opening the shutters of both eyes of the shutter glasses only at the timing of the user information.

In some embodiments, the dummy information may be generated by the mobile device, in others dummy information may be generated by the system, and in others the dummy information may be generated in differing amounts or to differing degrees by both the mobile device and the system.

The present invention may be a system, a method, and/or a computer program product at any possible technical detail level of integration. The computer program product may include a computer readable storage medium (or media) having computer readable program instructions thereon for causing a processor to carry out aspects of the present invention. While embodiments of the invention may be referred to herein as a system or display system, one skilled in the art would understand the invention to encompass computer program products and methods in addition to systems.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to utilize dummy information to allow the public display of a user's information while maintaining the privacy of that information.

Figure 1:
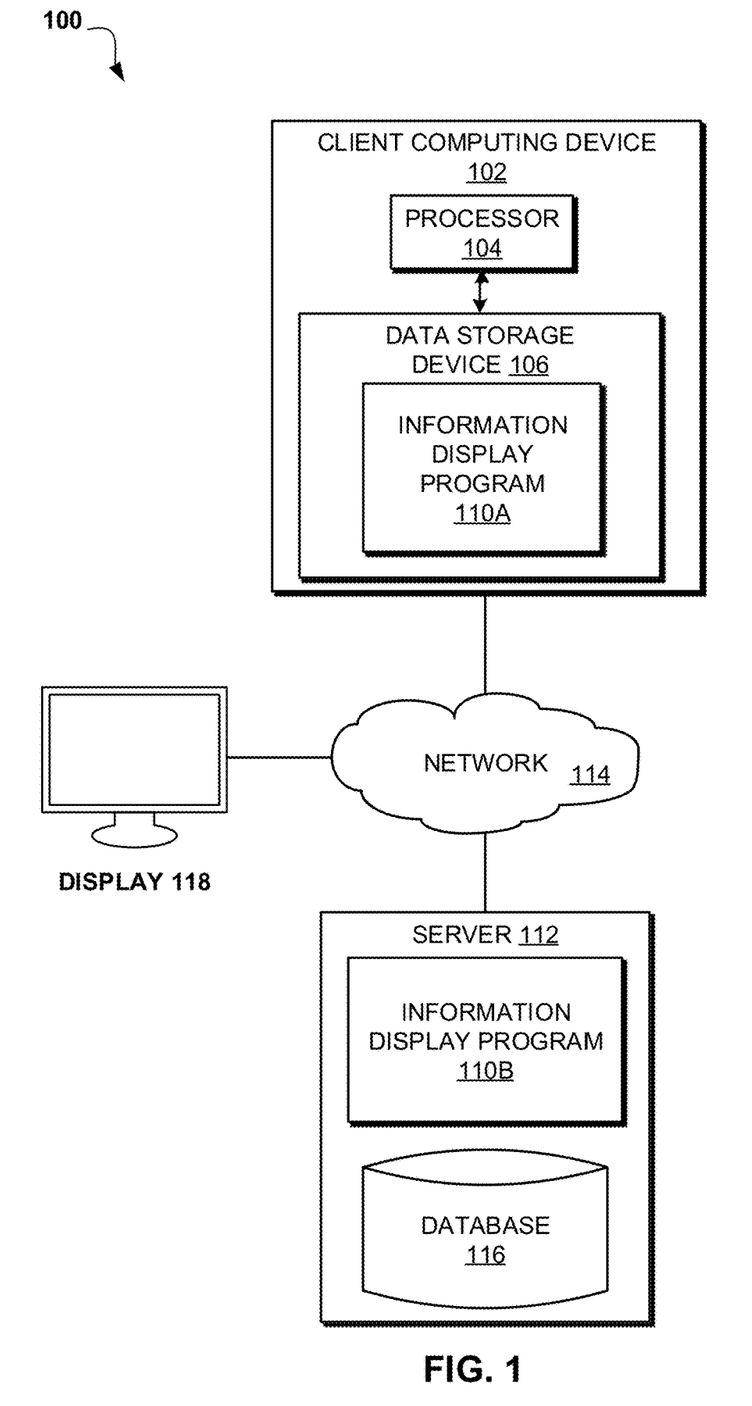
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an information display program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a wearable computing device, or any type of computing device small enough to be easily transported on someone's person and capable of running a program and accessing a network. In various embodiments, client computing device 102 may include a small visual display screen (not shown in FIG. 1), e.g., 2.5 in.×5 in. However, client computing device 102 may not necessarily be equipped with a visual display. As will be discussed with reference to FIG. 8, the client computing device 102 may include internal components 802a and external components 804a, respectively.

The server computer 112 may be a laptop computer, netbook computer, personal computer (PC), a desktop computer, or any programmable electronic device or any network of programmable electronic devices capable of hosting and running an information display program 110B and a database 116 and communicating with the client computing device 102 via the communication network 114 and a display 118, in accordance with embodiments of the invention. Public display 118 may be a digital display viewable by at least two persons and displaying information intended for viewing by at least two persons who are at a particular distance from the display device, although not necessarily simultaneously, for instance in a train station, the lobby of a business, a supermarket, et cetera. As one example, public display 118 may be viewable by at least one person who is at distance greater than three meters from the display device. While the display 118 is referred to herein as a "public" display, this is for convenience, and it is not essential that a local area in which the display is disposed be freely open to all members of the general public. For example, the display 118 may be located on the grounds of a private club or on the grounds of an area requiring a security clearance for admission. Display 118 may be connected to network 114, or, in some embodiments of the invention, may be directly in communication with server computer 112. As will be discussed with reference to FIG. 8, the server computer 112 may include internal components 802b and external components 804b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the information display program 110A, 110B may be a program enabled to utilize dummy information to allow the public display of a user's information while maintaining the privacy of that information. The information display program 110A, 110B may be located on client computing device 102 or server 112 or on any other device located within network 114. Furthermore, information display program 110A, 110B may be distributed in its operation over multiple devices, such as client computing device 102 and server 112. The privacy-sensitive public information display method is explained in further detail below with respect to FIGS. 2 and 3.

Figure 2:
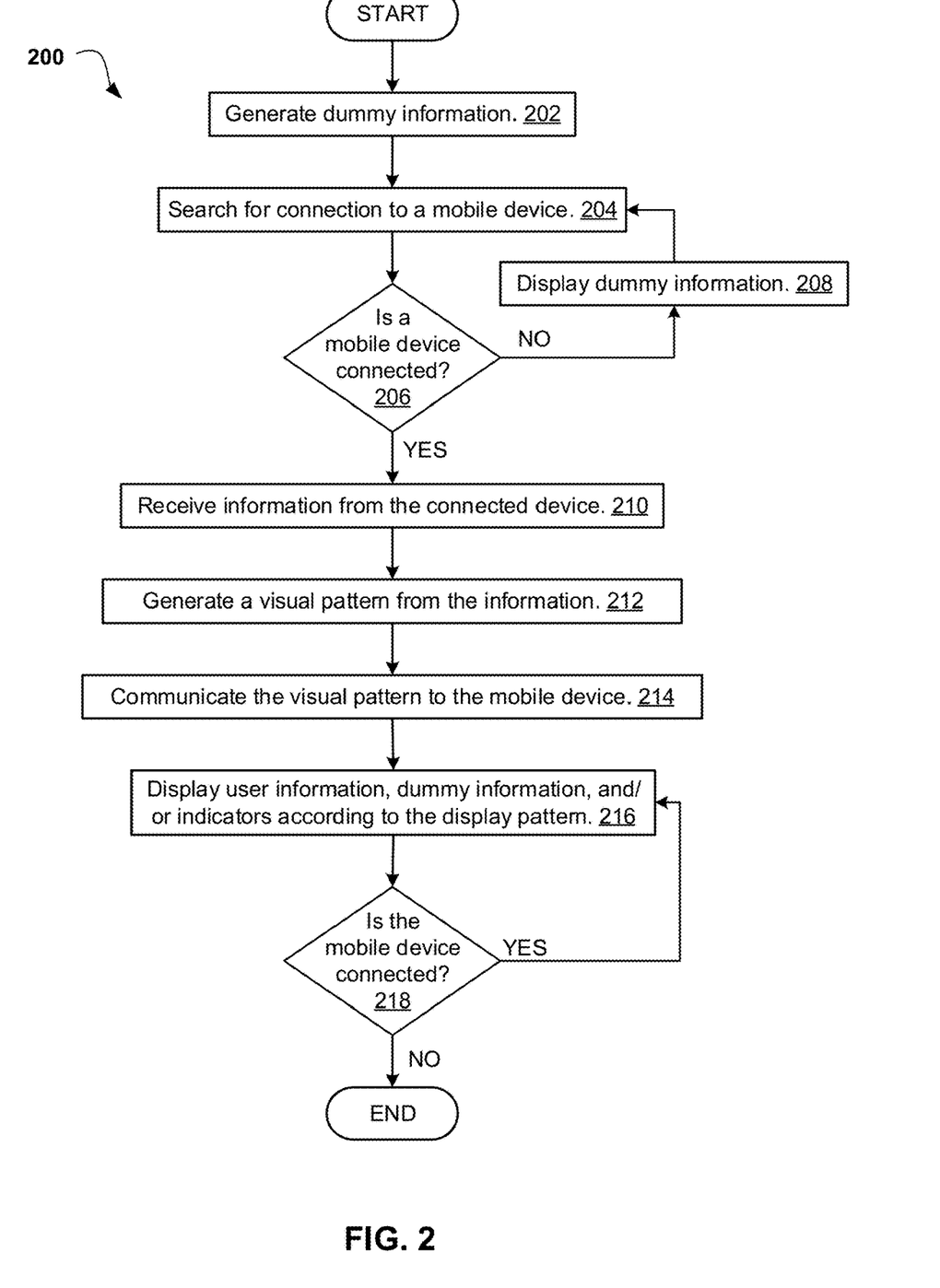
FIG. 2 is an operational flowchart illustrating a privacy-sensitive public information display process according to at least one embodiment.

Referring now to FIG. 2, an operational flowchart illustrating a privacy-sensitive public information display process 200 is depicted according to at least one embodiment. At 202, the information display program 110A, 110B generates dummy information. The information display program 110A, 110B may generate dummy information utilizing information crawled from repositories on or in communication with network 114, internet sites or databases, stored information previously received from mobile devices, generated by an algorithm, et cetera. The dummy information may include dummy indicators. The dummy information generation process is explained in further detail below with respect to FIG. 4.

At 204, the information display program 110A, 110B may search for connection to a mobile device. The information display program 110A, 110B may actively seek a connection to any mobile devices in range. In some embodiments, information display program 110A, 110B may seek to connect to any number of mobile devices. In some embodiments, information display program 110A, 110B may seek to connect to any mobile device that is within a threshold distance of a display, where the threshold distance is predetermined, and may be based on a range of a wireless connection between the mobile device and the display, or wireless communication equipment used by information display program 110A, 110B, a size of a display, a number of articles on the display, a number of connected users, et cetera.

At 206, the information display program 110A, 110B determines whether a mobile device is connected. Here the information display program 110A, 110B determines whether a mobile device is connected to information display program 110A, 110B, such as by joining network 114. In the cases where information display program 110A, 110B has access to one or more displays, information display program 110A, 110B may determine whether a mobile device is connected to any display. According to one implementation, if the information display program 110A, 110B does connect with a mobile device (step 206, "YES" branch), the information display program 110A, 110B may continue to step 210 to receive information from the connected device. If the information display program 110A, 110B determines that a mobile device is not connected (step 206, "NO" branch), the information display program 110A, 110B may continue to step 208 to display dummy information.

At 208, the information display program 110A, 110B displays dummy information. While there are no users connected, the information display program 110A, 110B may display dummy information on display 118. The displayed dummy information may include any number of articles of dummy information; the number of articles displayed may depend on the size, resolution, and/or the estimated distance of viewers from the display. The displayed articles of dummy information may correspond to any type of information. If there are indicators, information display program 110A, 110B may change the type of the indicators.

At 210, the information display program 110A, 110B receives information from the connected mobile device. The information may comprise user information, dummy information, indicators, and dummy indicators. In some embodiments, information display program 110A, 110B may receive dummy information and user information from the connected mobile device in a form fit to display, and in other embodiments may need to perform additional formatting on the received information. The information may include tags identifying the type of information, or the type of application from which a given piece of information originated. The received dummy information may be of the same type as the received user information, or may include any number of different types. In some embodiments of the invention, information display program 110A, 110B receives the information in response to a prompt, and that prompt may specify one or more types of indicator. For example, if the indicator changes between multiple types, the information display program 110A, 110B may request the current type. In other embodiments of the invention, information display program 110A, 110B may receive every type of indicator, and store the received indicator types as affiliated with the originating user to reduce the amount of data that need to be transmitted between information display program 110A, 110B and the mobile device. In such embodiments, information display program 110A, 110B may prompt the mobile device for updated indicators if the type of indicators in use changes. Where information display program 110A, 110B requires a type of indicator not yet received from a given user, information display program 110A, 110B may prompt the user for the indicator along with instructions or guidelines for selecting the indicator. For instance, where the indicator is a pet, information display program 110A, 110B may prompt the user for an indicator that is in the form of a picture, and that contains a childhood pet that the user would recognize.

At 212, the information display program 110A, 110B generates a visual pattern from the information. The visual pattern may be a blinking pattern, where information display program 110A, 110B displays the article of information for an interval of time and then hides the article for an interval of time, may include movement around the screen, may include alternating movement and stillness, et cetera. The information display program 110A, 110B generates a different visual pattern for each article of information, both dummy information and user information, although information display program 110A, 110B may coordinate the generated visual patterns for the various articles to prevent articles from interfering with each other, for example so that articles blink in at the same time other articles blink out such as to maintain a constant number of articles on the display, or so that moving articles never overlap other articles. In some embodiments, the information display program 110A, 110B may continually adjust the visual pattern in real time as mobile devices connect and disconnect.

At 214, the information display program 110A, 110B communicates the visual pattern to the mobile device. The information display program 110A, 110B may communicate only the article or articles of user information pertaining to the user of the mobile device, so that the user does not have access to additional information that could potentially assist the user in identifying the user information of other users. The information display program 110A, 110B may further communicate instructions for the mobile device to provide haptic or visual feedback, such as vibrating or displaying the user information on the mobile device, in response to the visual pattern. For example, information display program 110A, 110B may communicate an instruction for a mobile device to vibrate when the relevant article of user information blinks onto the display, and stop vibrating when the article of user information blinks off.

At 216, the information display program 110A, 110B displays user information, dummy information, and/or indicators according to the visual pattern. Here, the information display program 110A, 110B may display articles of user information and dummy information, including any respective indicators, on the display in the generated visual pattern. If the mobile device is connected to, or within a threshold distance of, multiple displays, information display program 110A, 110B may display the articles of user information pertaining to that mobile device on each of the aforementioned multiple displays. In other embodiments where there are multiple displays, and information display program 110A, 110B receives location information from the mobile device, information display program 110A, 110B may infer a direction of travel from changes in the location of a mobile device, and display the articles of user information pertaining to the mobile device on the displays in the direction of travel of the mobile device. In some embodiments, information display program 110A, 110B may infer a facing of the mobile device from accelerometer data, and display the user information on the displays that the mobile device is facing, or cease displaying user information on displays that the mobile device is not facing.

At 218, the information display program 110A, 110B determines whether the mobile device is connected. Here the information display program 110A, 110B determines whether a mobile device is connected to information display program 110A, 110B, such as by joining network 114. In the cases where information display program 110A, 110B has access to one or more displays, information display program 110A, 110B may determine whether the mobile device is connected to any display. According to one implementation, if the information display program 110A, 110B determines that the mobile device is connected (step 218, "YES" branch), the information display program 110A, 110B may continue to step 216 to display user information, dummy information, and indicators according to the visual pattern. If the information display program 110A, 110B determines that the mobile device is not connected to any display (step 218, "NO" branch), the information display program 110A, 110B may terminate. In alternate embodiments, information display program 110A, 110B may check whether the mobile device is within a threshold distance of any connected display, where the threshold distance is predetermined, and may be based on a range of a wireless connection between the mobile device and the display, or wireless communication equipment used by information display program 110A, 110B, a size of a display, a number of articles on the display, a number of connected users, et cetera. In some embodiments of the invention, the information display program 110A, 110B may continue to step 204 to search for connection to a mobile device instead of terminating, terminating only when instructed to do so by an external command. In some embodiments, information display program 110A, 110B may continue displaying the user information for a predetermined or random interval of time after the mobile device corresponding to the user information has disconnected.

Figure 3:
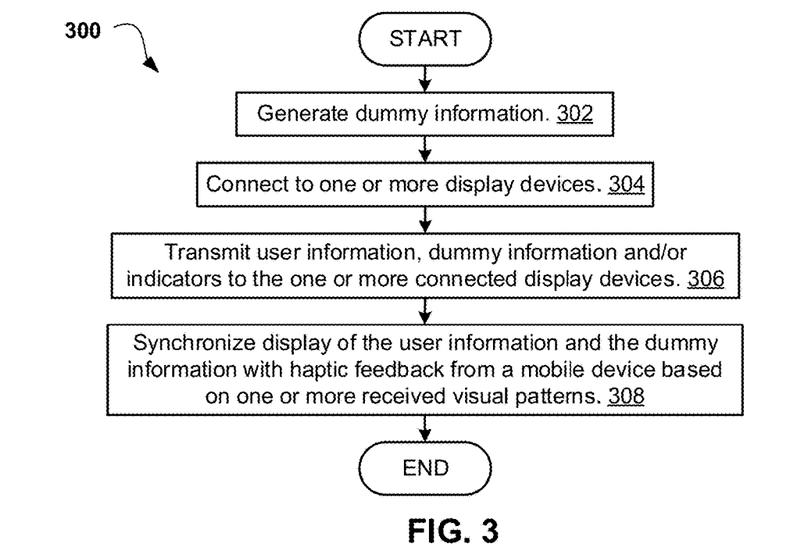
FIG. 3 is an operational flowchart illustrating a privacy-sensitive public information display process according to at least one embodiment.

Referring now to FIG. 3, an operational flowchart illustrating a privacy-sensitive public information display process 300 is depicted according to at least one embodiment. At 302, the information display program 110A, 110B generates dummy information. The information display program 110A, 110B may generate dummy information utilizing information stored on the mobile device, such as user information. The dummy information may include dummy indicators. The dummy information generation process is explained in further detail below with respect to FIG. 4.

At 304, the information display program 110A, 110B connects to one or more display devices 118. In some embodiments, the user may specify which displays to connect to, and/or particular displays to avoid connecting to, if the user does not want user information displayed on particular displays. Connecting to or communicating with display devices may additionally be understood to mean connecting to or communicating with a software agent controlling the one or more display devices 118.

At 306, the information display program 110A, 110B transmits user information, indicators, and dummy information to the one or more connected display devices. The information display program 110A, 110B may transmit the indicator corresponding to the user information in response to a prompt or instructions by the display device 118. The information display program 110A, 110B may transmit the indicator corresponding to the user information in response to a user selection. The user may limit types of the user information transmitted to the one or more connected display devices 118 based on user preferences. For instance, a user may opt not to allow text messages to be transmitted, while allowing weather and navigation information. In some embodiments, the information display program 110A, 110B may append a type identifier onto the transmitted user information and/or dummy information based on the type of application from which the user information originated, where the type identifier indicates the type of the user information, such as navigation type, message type, event type, et cetera. The type of the application may correspond with or may be the same as the type of the user information the application provides.

At 308, the information display program 110A, 110B synchronizes the display of the user information and the dummy information with haptic feedback from a mobile device based on one or more received visual patterns. The information display program 110A, 110B may receive a visual pattern from the display, and may provide haptic or visual feedback, such as vibrating or displaying the user information, in response to the visual pattern. For example, if the received visual pattern involves a blinking pattern, where the article of user information blinks on and off, information display program 110A, 110B may operate the mobile device to vibrate when the relevant article of user information blinks onto the display, and stop vibrating when the article of user information blinks off.

Figure 4:
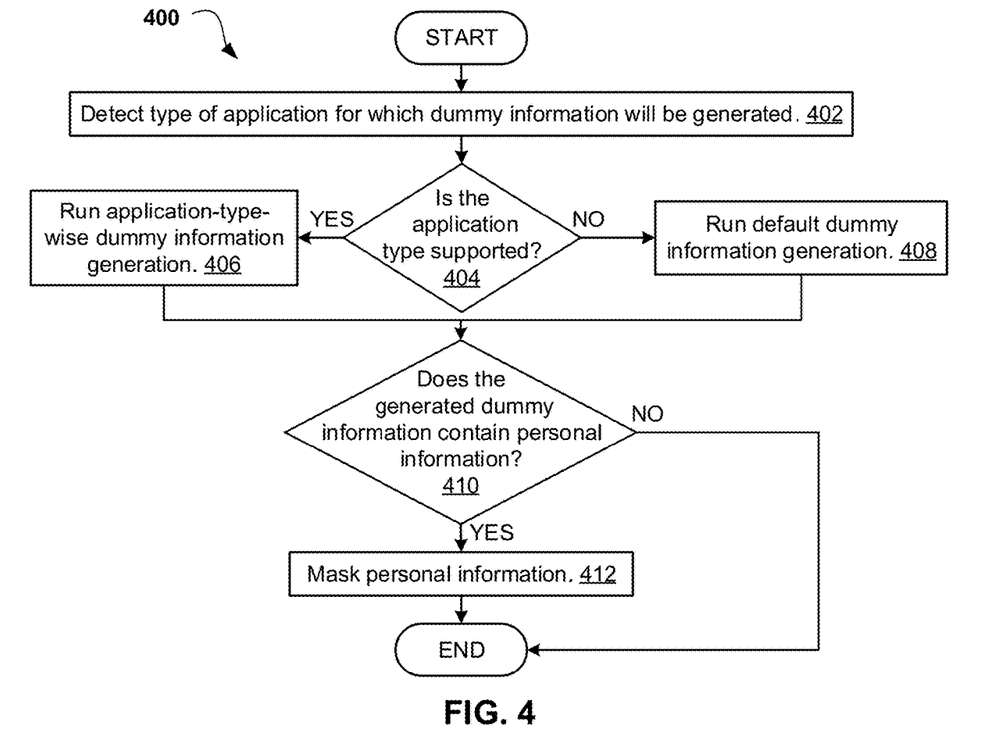
FIG. 4 is an operational flowchart illustrating a dummy information generation process according to at least one embodiment.

Referring now to FIG. 4, an operational flowchart illustrating a dummy information generation process 400 is depicted according to at least one embodiment. At 402, the dummy information generation process 400 detects the type of application for which dummy information will be generated. In embodiments where the mobile device or application appends a type identifier to the user information, the dummy information generation process 400 may simply read the type identifier from the user information. In some embodiments, the application may be pre-categorized to facilitate organization and marketing on digital marketplaces; in such embodiments, type information may be received from the application itself, or obtained from digital marketplaces, reviews, or other online sources.

At 404, the dummy information generation process 400 determines whether the application type is supported. The dummy information generation process 400 may determine whether the application type is supported by checking the application type against a pre-supplied list of supported application types. According to one implementation, if the application is supported (step 404, "YES" branch), the dummy information generation process 400 may continue to step 406 to run application-type-wise dummy information generation. If the dummy information generation process 400 determines that the application is not supported (step 404, "NO" branch), the dummy information generation process 400 may continue to step 408 to run default dummy information generation.

At 406, the dummy information generation process 400 runs application-type-wise dummy information generation. Application-type-wise dummy information generation may include generating dummy information in different ways depending on the type. For navigation type information, dummy information generation process 400 may utilize a template, which may contain parameters, such as directions and distance, for which different specific candidates may be substituted to create dummy information. The list of candidates may be predetermined, and may be pruned or supplemented via machine learning based on received user information. As an example, a navigation type template may appear as follows: "Follow instruction ${Direction Kind}" "Go ${Distance} meters." The {Direction Kind} variable may be populated with one of a presupplied list of values, including Left ("turn left"), Right ("turn right"), Straight ("go straight"), Back ("return"), and the {Distance} variable may be populated with any number between 1 and 99. To produce the dummy information, dummy information generation process 400 may randomly select one of the {Direction Kind} values, and randomly select one of the {Distance} values. For text type, or types where the user information is a text message, email, or other natural language string, dummy information generation process 400 may utilize a chatbot to produce natural language messages. The dummy information generation process 400 may also take text type user information and create variances to change the structure until the text no longer pertains to the user, such as by substituting words into sentences.

At 408, the dummy information generation process 400 may run default dummy information generation. Default dummy information generation may include any sample sentence generation program in the prior art. For instance, a random sentence generator, or context-free grammar generator.

At 410, the dummy information generation process 400 determines whether the generated dummy information contains user information, or other personal information that a user would not want displayed. The dummy information generation process 400 may identify personal information via machine learning based on user information received in the past, or similar information formats pre-identified or flagged as personal information by human moderators; for instance, identifying numbers in the format of phone numbers, personal identification numbers, or social security numbers, or strings formatted like addresses. Dummy information generation process 400 may also identify personal information using any other personal information identification methods in the prior art. According to one implementation, if the generated dummy information contains personal information (step 410, "YES" branch), the dummy information generation process 400 may continue to step 412 to mask personal information. If the dummy information generation process 400 determines that the generated dummy information does not contain personal information (step 410, "NO" branch), the dummy information generation process 400 may terminate.

At 412, the dummy information generation process 400 may mask personal information. The dummy information generation process 400 may mask personal information by deleting the dummy information containing personal information, or by altering numbers, words, or phrases to render the detected personal information meaningless.

Figure 5:
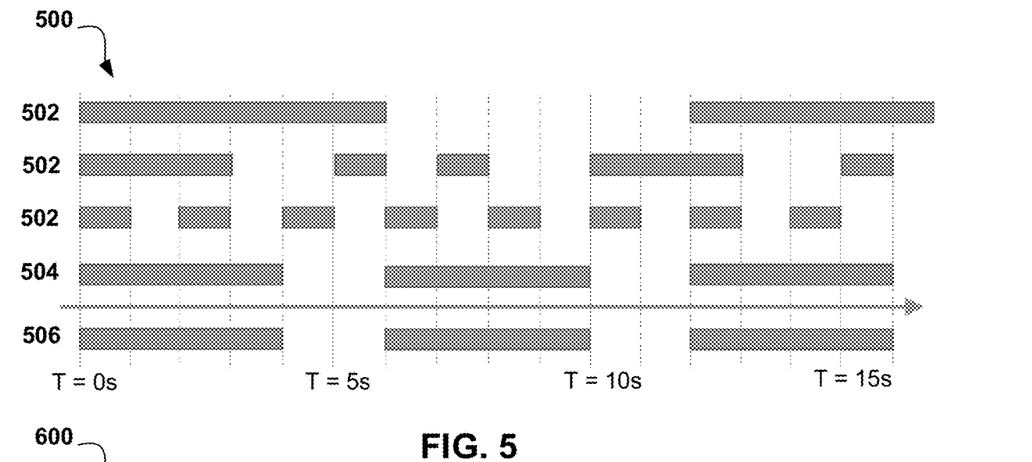
FIG. 5 is a graph illustrating a synchronization between information displayed on a public display and a connected mobile device by a privacy-sensitive public information display process according to at least one embodiment.

Referring now to FIG. 5, a graph illustrating a synchronization between information displayed on a public display and a connected mobile device by a privacy-sensitive public information display process 500 is depicted according to at least one embodiment. The Y axis of graph 500 represents the display of articles of information, where articles 502 represent articles of dummy information displayed on the display device, and article 504 represents an article of user information on the display device. Haptic feedback 506 represents periods of haptic feedback produced by the mobile device. The X axis represents time in seconds, with each vertical line representing a one-second interval. Each article on a public display device is displayed at different intervals, with article 504 of user information being displayed for intervals of 5 seconds, each interval separated by two seconds of time where article 504 is not displayed. The mobile device produces haptic feedback 506 in synchrony with the display of article 504 on the mobile device; the mobile device generates haptic feedback for intervals of 5 seconds, each interval separated by two seconds of time where haptic feedback is not generated.

Figure 6:
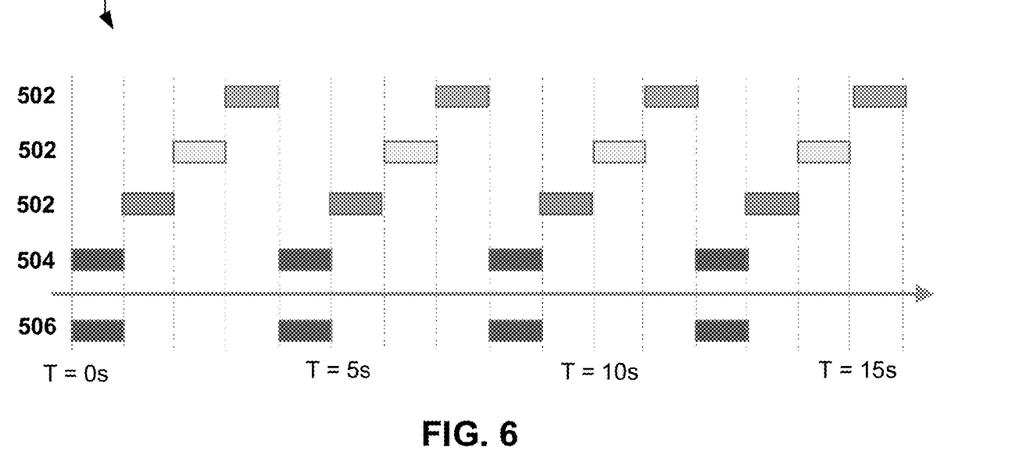
FIG. 6 is a graph illustrating a synchronization between information displayed on a public display and a connected mobile device by a privacy-sensitive public information display process according to at least one embodiment.

Referring now to FIG. 6, a graph illustrating a synchronization between information displayed on a public display and a connected mobile device by a privacy-sensitive public information display process 600 is depicted according to at least one embodiment. The Y axis of graph 600 represents the display of articles of information, where articles 502 represent articles of dummy information displayed on a public display device, and article 504 represents an article of user information on the display device. Haptic feedback 506 represents periods of haptic feedback produced by the mobile device. The X axis represents time in seconds, with each vertical line representing a one-second interval. Each article on the display device is displayed at different intervals, with article 504 of user information being displayed for intervals of 1 seconds, each interval separated by 3 seconds of time where article 504 is not displayed. The mobile device produces haptic feedback 506 in synchrony with the display of article 504 on the mobile device; the mobile device generates haptic feedback for intervals of 1 second, each interval separated by 3 seconds of time where haptic feedback is not generated.

Referring now to FIG. 7, an exemplary use case of a privacy-sensitive public information display process 700 is depicted according to at least one embodiment. Here, the client computing device 102, having a display screen 103, of a user interfaces with a public display 118 to display the user's destination 702, which is displayed on both the client computing device 102 and display 118. However, display 118 is displaying four articles, the user's destination 702 as well as three additional destinations 708A, 708B, and 708C, which may be dummy information or may be articles of other users in communication with the public display 118. The user may distinguish her destination 702 from the other displayed destinations 708A, 708B, and 708C thanks to the presence of an indicator in the form of an image of a past pet. The user recognizes an indicator 704, which depicts a childhood cat of hers, which stands out from the other indicators 706A, 706B, and 706C. The user may continue on her way. In emergency cases where the user did not recognize indicator 704, for instance where indicator 706B depicts a pet very similar to hers, the user may look at her client computing device 102 to confirm her destination as 702.

It may be appreciated that FIGS. 2-7 provides only illustrations of individual implementations and do not imply any limitations with regard to how different embodiments may be implemented. Many modifications to the depicted environments may be made based on design and implementation requirements.

Figure 8:
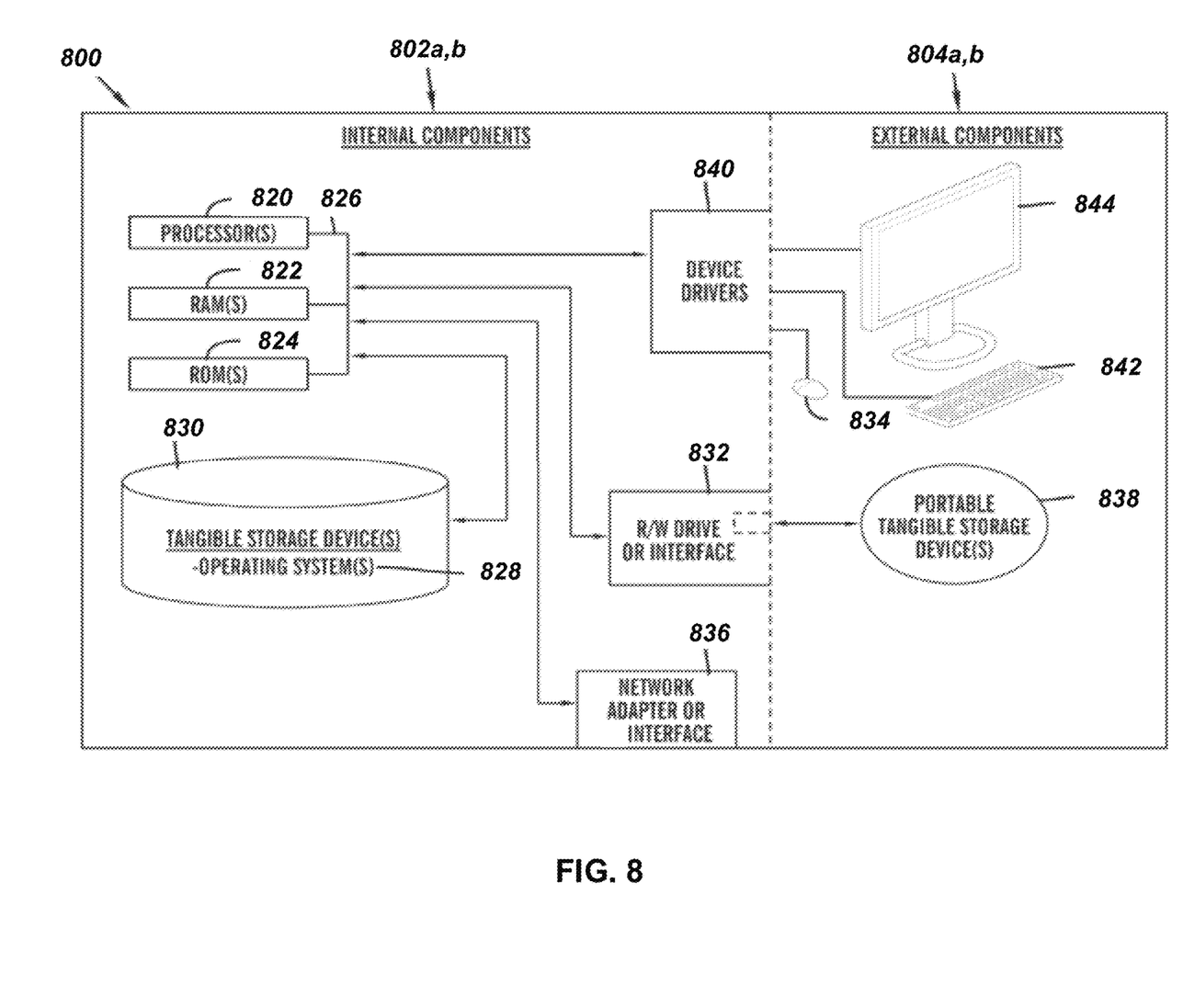
FIG. 8 is a block diagram of internal and external components of computers and servers depicted in FIG. 1 according to at least one embodiment.

FIG. 8 is a block diagram 800 of internal and external components of the client computing device 102 and the server 112 depicted in FIG. 1 in accordance with an embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

The data processing system 802, 804 is representative of any electronic device capable of executing machine-readable program instructions. The data processing system 802, 804 may be representative of a smart phone, a computer system, PDA, or other electronic devices. Examples of computing systems, environments, and/or configurations that may represented by the data processing system 802, 804 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 802a,b and external components 804a,b illustrated in FIG. 8. Each of the sets of internal components 802 include one or more processors 820, one or more computer-readable RAMs 822, and one or more computer-readable ROMs 824 on one or more buses 826, and one or more operating systems 828 and one or more computer-readable tangible storage devices 830. The one or more operating systems 828 and the information display program 110A in the client computing device 102, and the information display program 110B in the server 112 are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 802a,b also includes a R/W drive or interface 832 to read from and write to one or more portable computer-readable tangible storage devices 838 such as a CD-ROM, DVD, memory stick, magnetic tape, magnetic disk, optical disk or semiconductor storage device. A software program, such as the information display program 110A, 110B, can be stored on one or more of the respective portable computer-readable tangible storage devices 838, read via the respective R/W drive or interface 832, and loaded into the respective hard drive 830.

Each set of internal components 802a,b also includes network adapters or interfaces 836 such as a TCP/IP adapter cards, wireless Wi-Fi interface cards, or 3G or 4G wireless interface cards or other wired or wireless communication links. The information display program 110A in the client computing device 102 and the information display program 110B in the server 112 can be downloaded to the client computing device 102 and the server 112 from an external computer via a network (for example, the Internet, a local area network or other, wide area network) and respective network adapters or interfaces 836. From the network adapters or interfaces 836 and the information display program 110A in the client computing device 102 and the information display program 110B in the server 112 are loaded into the respective hard drive 830. The network may comprise copper wires, optical fibers, wireless transmission, routers, firewalls, switches, gateway computers and/or edge servers.

Each of the sets of external components 804a,b can include a computer display monitor 844, a keyboard 842, and a computer mouse 834. External components 804a,b can also include touch screens, virtual keyboards, touch pads, pointing devices, and other human interface devices. Each of the sets of internal components 802 a,b also includes device drivers 840 to interface to computer display monitor 844, keyboard 842, and computer mouse 834. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
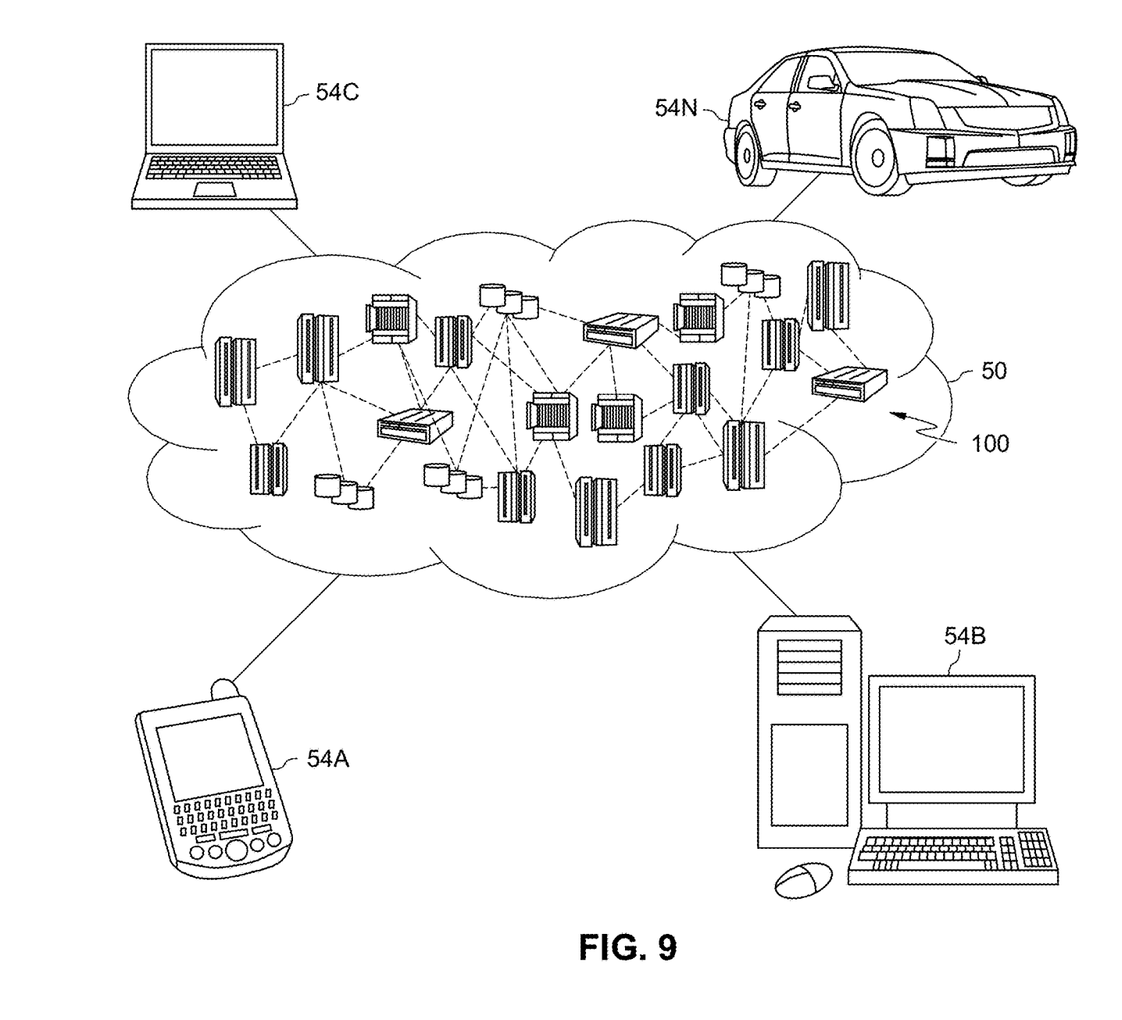
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 100 and cloud computing environment 50 can communicate with any type of computerized device over any type of network and/or network addressable connection (e.g., using a web browser).

Figure 10:
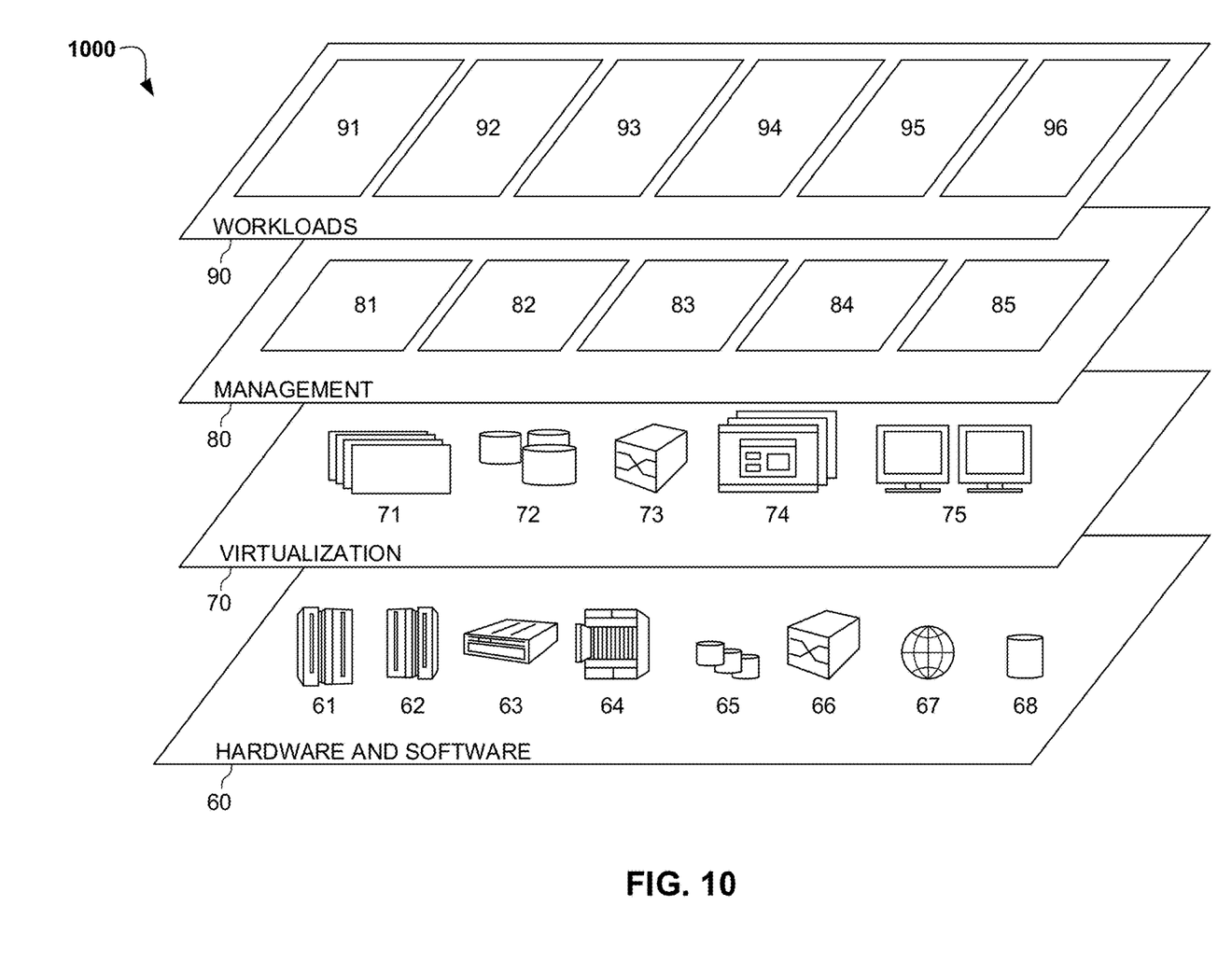
FIG. 10 depicts abstraction model layers according to an embodiment of the present invention.

Referring now to FIG. 10, a set of functional abstraction layers 1000 provided by cloud computing environment 50 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and privacy-sensitive public information display 96. The information display 96 may relate to utilize dummy information to allow the public display of a user's information while maintaining the privacy of that information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for displaying information on a display device, the method comprising:
    transmitting a plurality of user information to a display device together with a plurality of indicators associated with a user corresponding to the user information; and
    displaying, based on information received from a connected mobile device, the plurality of user information together with a randomly selected indicator of the plurality of indicators and a plurality of dummy information on the display device, wherein the dummy information comprises placeholder information that is displayed to look similar to the user information.

2. The method of claim 1, further comprising:
    displaying the plurality of user information on the display device based on a moving direction of the mobile device.

3. The method of claim 1, wherein the connected mobile device is within a threshold distance of the display device.

4. The method of claim 1, wherein the displaying is further based on a generated visual pattern.

5. The method of claim 4, further comprising:
    transmitting the generated visual pattern to the mobile device.

6. The method of claim 1, wherein the plurality of user information is displayed on the display device for a duration after the mobile device has disconnected from the display device.

7. A computer system for displaying information on a display device, the computer system comprising:
    one or more processors, one or more display devices, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
        transmitting a plurality of user information to a display device together with a plurality of indicators associated with a user corresponding to the user information; and
        displaying, based on information received from a connected mobile device, the plurality of user information together with a randomly selected indicator of the plurality of indicators and a plurality of dummy information on the display device, wherein the dummy information comprises placeholder information that is displayed to look similar to the user information.

8. The computer system of claim 7, further comprising:
    displaying the plurality of user information on the display device based on a moving direction of the mobile device.

9. The computer system of claim 7, wherein the connected mobile device is within a threshold distance of the display device.

10. The computer system of claim 7, wherein the displaying is further based on a generated visual pattern.

11. The computer system of claim 10, further comprising:
    transmitting the generated visual pattern to the mobile device.

12. The computer system of claim 7, wherein the plurality of user information is displayed on the display device for a duration after the mobile device has disconnected from the display device.

13. A computer program product for displaying information on a display device, the computer program product comprising:
    one or more computer-readable tangible storage medium and program instructions stored on at least one of the one or more tangible storage medium, the program instructions executable by a processor to cause the processor to perform a method comprising:
        transmitting a plurality of user information to a display device together with a plurality of indicators associated with a user corresponding to the user information; and
        displaying, based on information received from a connected mobile device, the plurality of user information together with a randomly selected indicator of the plurality of indicators and a plurality of dummy information on the display device, wherein the dummy information comprises placeholder information that is displayed to look similar to the user information.

14. The computer program product of claim 13, further comprising:
    displaying the plurality of user information on the display device based on a moving direction of the mobile device.

15. The computer program product of claim 13, wherein the connected mobile device is within a threshold distance of the display device.

16. The computer program product of claim 13, wherein the displaying is further based on a generated visual pattern.

17. The computer program product of claim 16, further comprising:
    transmitting the generated visual pattern to the mobile device.

* * * * *